United States Patent
Wyseur et al.

(10) Patent No.: US 11,297,170 B2
(45) Date of Patent: Apr. 5, 2022

(54) DATA TRANSMISSION METHOD, TRANSMITTER AND RECEIVER

(71) Applicant: NAGRAVISION S.A., Cheseaux-sur-Lausanne (CH)

(72) Inventors: Brecht Wyseur, Cheseaux-sur-Lausanne (CH); Klaus Kursawe, Cheseaux-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 16/958,081

(22) PCT Filed: Dec. 26, 2018

(86) PCT No.: PCT/EP2018/086881
§ 371 (c)(1),
(2) Date: Jun. 25, 2020

(87) PCT Pub. No.: WO2019/129786
PCT Pub. Date: Jul. 4, 2019

(65) Prior Publication Data
US 2020/0322464 A1 Oct. 8, 2020

(30) Foreign Application Priority Data
Dec. 29, 2017 (EP) .................................... 17211229

(51) Int. Cl.
*H04L 29/06* (2006.01)
*H04L 9/32* (2006.01)
(Continued)

(52) U.S. Cl.
CPC ............ *H04L 69/22* (2013.01); *H04L 9/3215* (2013.01); *H04L 63/18* (2013.01); *H04W 84/18* (2013.01)

(58) Field of Classification Search
CPC ....... H04L 69/22; H04L 9/3215; H04L 63/18; H04W 84/18
See application file for complete search history.

(56) References Cited

U.S. PATENT DOCUMENTS

2015/0382233 A1* 12/2015 Oprescu-Surcobe ....................... H04W 28/04 370/312

OTHER PUBLICATIONS

Herrewege, A.V., et al., "CANAuth—A Simple, Backward Compatible Broadcast Authentication Protocol for CAN bus," ECRYPT Workshop on Lightweight Cryptography, Jan. 1, 2011, XP055329446, total pp. 7.

(Continued)

*Primary Examiner* — Joseph E Dean, Jr.
(74) *Attorney, Agent, or Firm* — Oblon, McClelland, Maier & Neustadt, L.L.P.

(57) ABSTRACT

A method of transmitting data to a receiver via a network includes transmitting a sequence of first data packets to the receiver via the network, each first data packet including payload data and identification data, the identification data identifying the respective first data packet, the identification data being different for each first data packet. The method also includes transmitting a corresponding second data packet for each first data packet to the receiver via the network, each second data packet including the data enabling identification of the corresponding first data packet and additional data related to the corresponding first data packet, the data enabling identification of the corresponding first data packet enabling the receiver to associate each second data packet with the corresponding first data packet.

13 Claims, 5 Drawing Sheets

(51) Int. Cl.
*H04L 69/22* (2022.01)
*H04W 84/18* (2009.01)

(56) References Cited

OTHER PUBLICATIONS

International Search Report and Written Opinion dated Jan. 25, 2019 in PCT/EP2018/086881 filed on Dec. 26, 2018, 11 pages.
European Office Action dated Aug. 13, 2021 in European Patent Application No. 18 826 399.0, 7 pages.

* cited by examiner

DATA TRANSMISSION METHOD, TRANSMITTER AND RECEIVER

FIELD

The present disclosure relates to data transmission methods and devices, in particular, although not exclusively to methods and devices for transmitting data over a network, such as networks operating under a protocol in which the packet size is limited, for example equal to a predefined payload size, for example certain legacy sensor network protocols.

BACKGROUND

Sensors are devices that produce measurement data. A wide variety of sensors exist such as those which measure temperature, electrical voltage, humidity, acceleration, positioning data amongst other things. Measurement data produced by a sensor can be sent over a network as part of a data packet. In some contexts, the data generated by sensors in a network may be sensitive, valuable and/or mission critical, so that tampering with the sensor data could represent security and safety risks. There is a need to provide authentication data by which the measurement data produced by sensors can be authenticated. Of course, it may sometimes be desirable to add additional data other than authentication data and the present disclosure is equally relevant in this case.

BRIEF DESCRIPTION OF THE DRAWINGS

Various embodiments are now described by way of example for the purpose of explanation and illustration, with reference to the accompanying drawings in which.

DETAILED DESCRIPTION OF THE DRAWINGS

In overview, disclosed methods, transmitters and receivers enable authentication data, or other additional data, related to a payload of a network packet to be added in a network operating with a protocol having a limited packet size. The communication protocols of some networks, in particular legacy sensor networks that were designed without authentication in mind, define a limited data packet size which can be transmitted across the networks, often specific to the size of the sensor payload. In such networks, there is a limit to how much data can be included in any single packet. It may often not be possible to add any additional data, such as authentication data, to each data packet sent across the network as the measurement data can take up all, or substantially all, of the available space in the data packets. Changing the protocol of an existing network in the field can be problematic or even impossible where embedded sensors may have hardware implemented network interfaces. Accordingly, it can be difficult to introduce further functionality, such as security features and in particular authentication, into a network where no additional data can be added to data packets sent across the network.

In particular, the disclosed methods, transmitters and receivers enable a sequence of first data packets and second data packets to be sent across a network, each second data packet corresponding to one of the first data packets and containing data enabling identification of the corresponding first data packet and additional data, for example authentication data, related to the payload of the corresponding first data packet, such that corresponding first and second data packets can be associated by the receiver and the respective payload and additional data can used together, for example authenticating the payload with the additional data.

In some aspects of the disclosure, a method of transmitting data to a receiver via a network is provided. A sequence of first data packets are transmitted to the receiver and each of the first data packets comprises payload data, for example device data, such as measurement data, which is received from a device, such as a sensor. Each of the first data packets also comprises identification data, the identification data identifying the respective first data packet and being different for each first data packet. For example, the identification data may be a (alphanumeric) packet serial number, a time stamp, sequence identifier, or the like. As well as a sequence of first data packets, a corresponding second data packet is transmitted to the receiver for each of the transmitted first data packets. Each second data packet comprises data enabling identification of the corresponding first data packet and additional data related to the corresponding first data packet, for example the additional data related to the payload of the corresponding first data packet. The data enabling identification of the corresponding first data packet enables the receiver to associate each second data packet with the corresponding first data packet. Each second data packet can thus be associated at the receiver with the corresponding first data packet using the data enabling identification of the corresponding first data packet.

Advantageously, through the use of second data packets which each comprise data enabling identification of the respective first data packet, the method enables additional data, which is related to the first data packet, to be transmitted via the network as part of the separate second data packet in such a way that the receiver can associate the additional data of the second data packet with that of the first. The payloads of each of the first and second data packets can thus be used together by the receiver, even though they have been sent separately across the network. This allows a total amount of related data that is greater than a maximum payload permitted by the data packet size of the network protocol to be sent across the network in such a way that the receiver can reassemble the data or use it together in other ways.

One particular advantageous application uses the disclosed concepts to upgrade an existing sensor network. Many such networks use packets that have a maximum payload corresponding to instances of the sensor data so that security data, such as authentication data, cannot be added to each packet as there is no free space in each packet. The present disclosure allows security data, for example authentication data authenticating the sensor data, to be sent alongside sensor measurement data, in the second data packet, for use with the first data packet at the receiver. Thus, the present disclosure facilitates the retrofitting of security features in existing sensor networks with packet size restrictions.

Thus, in some aspects of the disclosure, the method may comprise processing data from each of the first data packets to generate authentication data for each of the first data packets. The payload of the first data packets may be processed to generate the authentication data. Authentication data may be added as payload data to each corresponding second data packet and the additional data of each second data packet may comprise the added authentication data. The authentication data may be used for authenticating the data from each the corresponding first data packet which was processed to generate authentication data. For example, the payload of each first data packet may be authenticated using the corresponding authentication data. Advantageously, the authentication data can be used to authenticate the data of the corresponding first data packet. For example, the authentication data may be a digital signature of the first data packet (or the payload or header of the first data packet) and may be verified at the receiver using the public key corresponding to the digital signature with a known signature verification algorithm.

In some embodiments, processing data from each of the first data packets may comprise applying an authentication function, such as a message authentication code algorithm, a signing algorithm for generating a digital signature, or any other suitable algorithm as would be understood by the skilled person, to data of each first data packet, such as payload data (for example sensor data such as readings or measurements) and/or identification data. The output of the authentication function may be used as the authentication data for each of the first data packets. Advantageously, a recipient of the authentication data, who is also in possession of a corresponding verification function, together with any key or keys that may be required to verify the authentication data, is able to verify the authentication data of the first data packet so as to authenticate the first data packet. In the context of sensor networks, this means that the recipient of data sent from a sensor to the recipient over the network by the transmitter can be reasonably sure that the data originated from the sensor and that it has not been tampered with.

In some aspects of the disclosure, a corresponding method of receiving data from a transmitter via a network is provided. A sequence of first data packets of the type described above are received from the transmitter. As well as a sequence of first data packets, a corresponding second data packet, of the type described above, is received from the transmitter for each of the transmitted first data packets.

In some embodiments, each second data packet may comprise authentication data of the type described above. Consequently, the method may further comprise authenticating each of the first data packets by verifying the authentication data obtained from the corresponding second data packet, as described above. Authenticating each of the first data packets may comprise applying a verification function to data from each of the first data packets to authenticate each first data packet.

Also disclosed are transmitters and receivers implementing the disclosed methods. A transmitter for transmitting data to a receiver via a network comprises a processing environment that is configured to transmit a sequence of first and second data packets as described above to the receiver via the network. Aspects of the disclosure extend to sensors comprising the described transmitter.

In all of the above aspects of the disclosure, a protocol of the network may define a data packet size for data packets which are transmitted across the network, wherein the payload data each first data packet is substantially filled by data received from a device, such as a sensor. In the case of a sensor network, the protocol may be limited to use one data packet per sensor reading, thus constraining or preventing the addition of additional data such as authentication.

Further aspects of the disclosure relate to a computer program product comprising instructions which, when the program is executed by a computer, cause the computer to carry out the method and a non-transitory computer readable medium having computer-executable instructions that, when executed on a computer system, implement the method.

A "data packet", or a "packet", is a formatted unit of data carried by a network. A data packet includes control information, usually found in a header or trailer of the data packet, and data to be transported across a network known as the payload. The control information provides data for delivering the payload, for example: source and destination network addresses.

If a first data packet has been "authenticated" this is to be understood to mean that the authentication data associated with the first data packet has been verified via the mechanisms described herein so that the recipient of the first data packet over the network can be reasonably sure that the data originated from the sensor and that it has not been tampered with.

"Authentication data" is any data which enables a first data packet to be authenticated. Various examples are given herein. A "digital signature" is one such example. A digital signature is a mathematical scheme for demonstrating the authenticity of digital messages or documents, such as data packets. A message authentication code (MAC) data tag is another example of authentication data.

If authentication data has been "verified", this is to be understood to mean that a verification function of the type described herein has been used to determine that the authentication data has been accepted.

Some specific embodiments are now described by way of illustration with reference to the accompanying drawings in which like reference numerals refer to like features.

Figure 1:
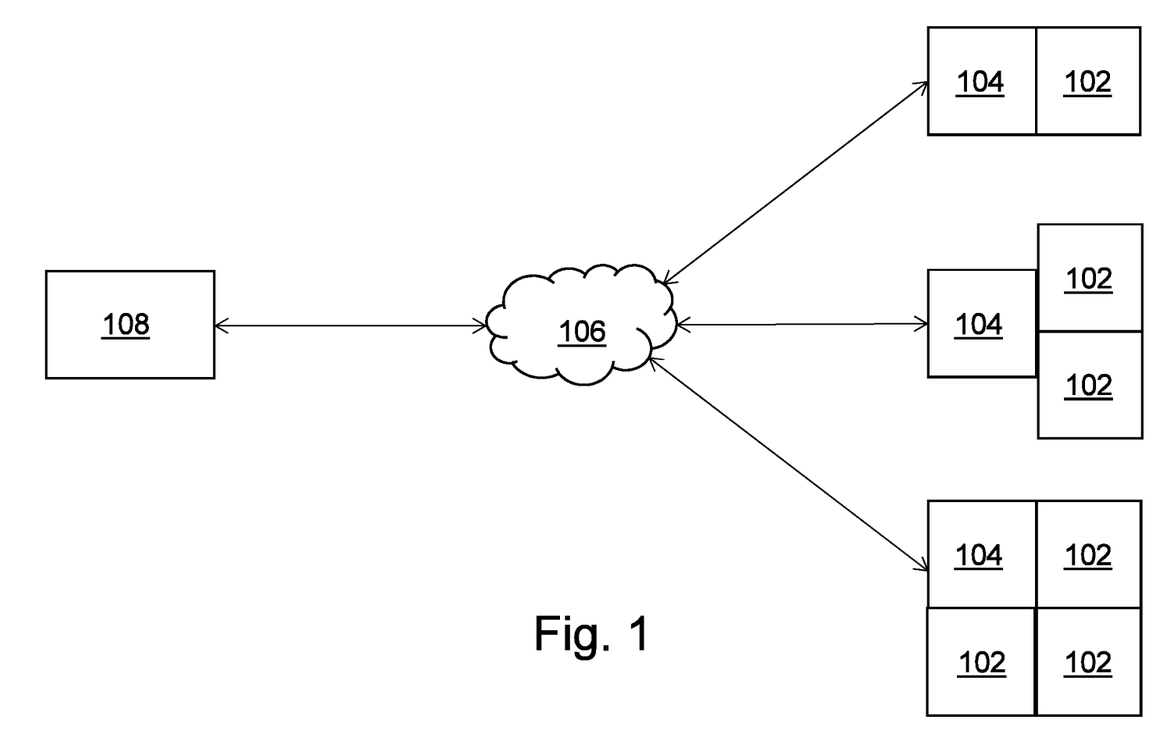
FIG. 1 illustrates a data transmission system comprising a device and a transmitter in communication with a receiver via a communications network.

With reference to FIG. 1, a sensor network comprises a plurality of sensors 102 and transmitters 104. Each transmitter 104 is in communication with at least one sensor 102. Each sensor 102 is configured to output measurement data to the transmitter 104 it is in communication with. The output measurement data may relate to pressure, temperature, radioactivity, current, voltage, weight, flow, humidity, acceleration and/or positioning data, amongst other things. In some embodiments, one or more of the transmitters 104 is an integrated component of a sensor 102. The sensors 102 could equally be any device which comprises a data source suitable for providing output data.

Each transmitter 104 sends data over a communications network 106 to a receiver 108. The transmitter 104 is configured to send the measurement data of the sensor or sensors 102 which it is in communication with to the receiver 108. Two of the illustrated transmitters 104 are in communication with multiple sensors 102.

The network 106 is a packet based network, meaning that data is sent across the network 106 in the form of discrete data packets. The network 106 operates under a protocol which defines a data packet size of data packets transmitted across the network 106. The data packet size determines how much data each packet can carry.

The measurement data of each sensor 102 is sent by the transmitter 104 with which it is in communication across the network 106 as discrete first data packets, in accordance with the protocol of the network 106. Each first data packet comprises a header and a payload. The header comprises information identifying the recipient of the first data packet, such as an IP address of the receiver 108, as well as identification data identifying the first data packet, the identification data being different for each first data packet. The payload comprises the measurement data of the sensor 102. Measurement data produced by the sensor 102 may fill, or substantially fill, the payload of each first data packet such that no additional data can be added to the payload.

For each of the first data packets, authentication data for authenticating a corresponding first data packet is sent by the transmitter 104 across the network 106 as a discrete second data packet, in accordance with a protocol of the network 106. In some embodiments, the authentication data of each second data packet may be replaced with other data related to the corresponding first data packet, such as metadata. Equally, authentication data may be provided alongside additional data.

Each second data packet comprises a header and a payload. Identification data enabling identification of the corresponding first data packet may be included in the payload or in the header. The identification data enables the receiver to associate each second data packet with the corresponding first data packet.

Figure 2:
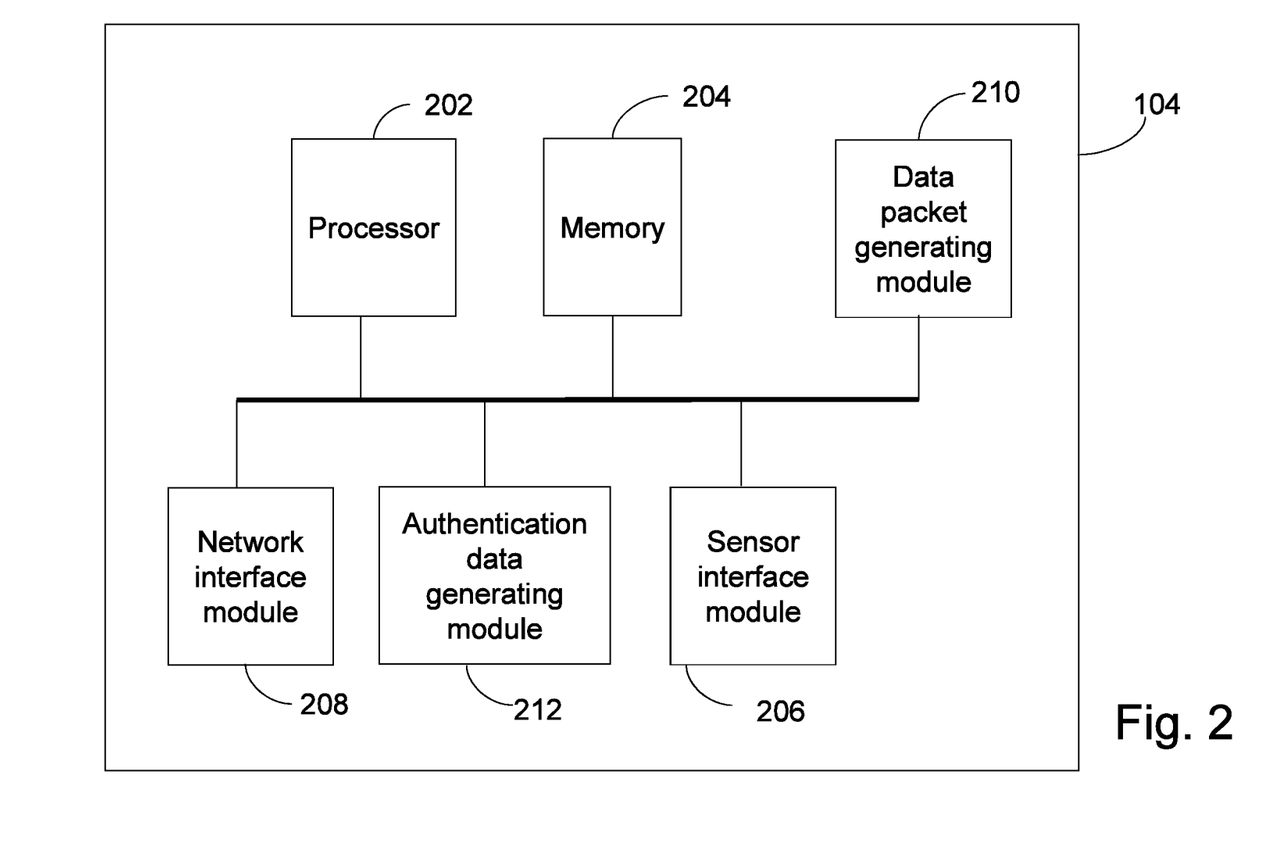
FIG. 2 illustrates a transmitter in further detail.

With reference to FIG. 2, some embodiments of the transmitter 104 are now described. The transmitter 104 comprises a processor 202, in communication with a memory 204, a sensor interface module 206, a network interface module 208 a data packet generating module 210 and an authentication data generating module 212. The processor 202 is arranged to coordinate between the sensor interface module 206, the network interface module 208, the data packet generating module 210 and the authentication data generating module 212. The memory 204 can store instructions for execution by the processor 202 to cause the processor 202 to provide desired functionality.

The sensor interface module 206 is arranged to receive a data output from one or more sensors 102 with which the transmitter 104 is in communication. The data output of the sensor 102 comprises measurement data produced by the sensor 102. The network interface module 208 is arranged to send data from the transmitter 104 to the receiver 108 across the network 108. The data packet generating module 210 is arranged to generate data packets for sending across the network 106 by the network interface module 208. The data packet generating module 210 generates first data packets comprising the measurement data of the sensor 102 and second data packets, each comprising data enabling identification of a corresponding first data packet as well as authentication data related to the corresponding first data packet.

In embodiments where the sensor or sensors 102 are other data outputting devices, the sensor interface module 206 could equally device interface module suitable for communicating with any data outputting device.

In some embodiments, the first data packets comprising the measurement data of the sensor 102 are received at the sensor interface module 206 and second data packets, each comprising data enabling identification of a corresponding first data packet as well as authentication data related to the corresponding first data packet, are generated by the data packet generating module 210.

The authentication data generating module 212 generates authentication data for inclusion in the second data packets generated by the data packet generating module 210. The authentication data is included in each second data packet's payload as additional data. The additional data may include additional metadata. The authentication function may be a message authentication code (MAC) algorithm, a signing algorithm of a digital signature scheme, or a cryptographic hash function. The authentication module 212 may use a cryptographic function or a secure key common to both the transmitter 104 and the receiver 108 to provide the authentication data. Any suitable authentication scheme may be used.

In the example of a MAC algorithm, the authentication data generating module 212 runs data from the first data packet through a MAC algorithm (which is the authentication function in this example) using a key to produce a MAC data tag. The data and the MAC tag are then sent to the receiver, the data as part of the first data packet, the MAC tag as part of the corresponding second data packet. The receiver 108 in turn runs the data, received as part of the first data packet, through the same MAC algorithm (which is the verification function in this example) using the same key, producing a second MAC data tag. The receiver 108 then compares the first MAC tag, received as part of the second data packet, to the second generated MAC tag. If they are identical, the receiver 108 can safely assume that the data was not altered or tampered with during transmission and a degree of data integrity is assured.

In the example of a digital signature scheme, a key generation algorithm first selects a private key uniformly at random from a set of possible private keys. The key generation algorithm outputs the private key and a corresponding public key. The private key is communicated to the transmitter 104 and the public key is communicated to the receiver 108. The authentication data generating module 212 uses a signing algorithm (which is the authentication function in this example) to produce a signature using data from the first data packet (or, alternatively, a hash or digest of data from the first data packet) and the private key. The signature is then sent to the receiver 108 as part of the second data packet corresponding to the first data packet. Upon receipt, the signature, the data from the first data packet (or a hash or digest of data from the first data packet where such has been used by the signing algorithm) and public key are run through a signature verifying algorithm (which is the verification function in this example), by the receiver 108, and the authenticity of the data is either accepted or rejected dependent upon the outcome.

Figure 3:
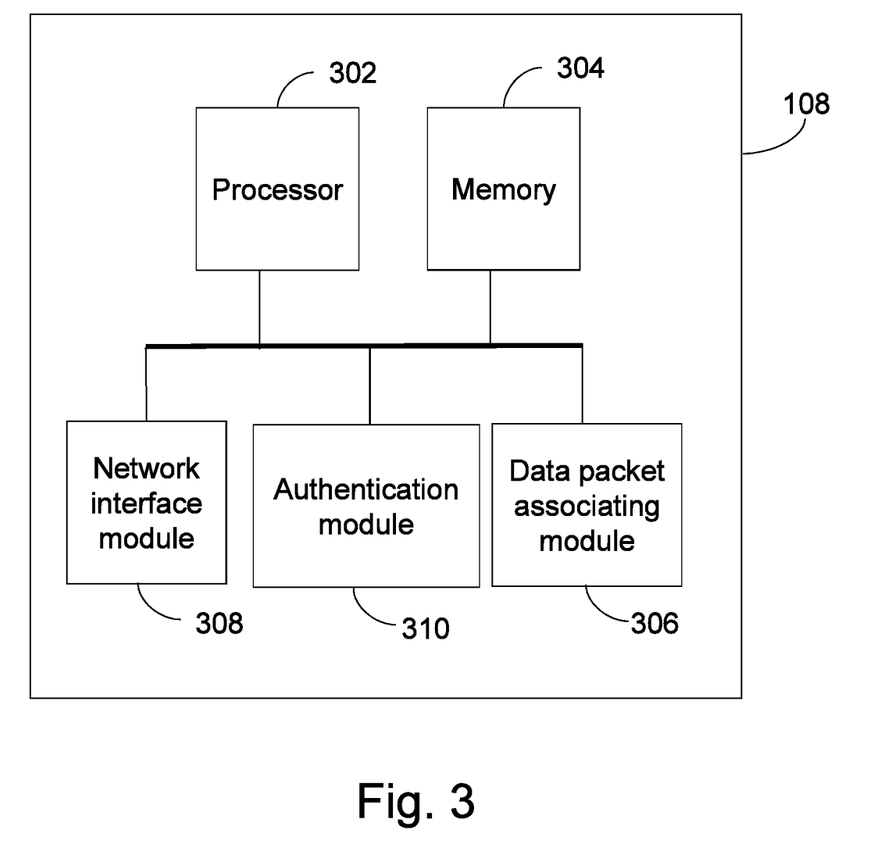
FIG. 3 illustrates a receiver in further detail.

With reference to FIG. 3, some embodiments of the receiver 108 are now described. The receiver 108 comprises a processor 302 in communication with a memory 304, a data packet associating module 306, a network interface module 308 and an authentication module 310. The processor is arranged to coordinate between the data packet associating module 306, the network interface module 308 and the authentication module 310. The memory 304 can store instructions for execution by the processor to cause the processor to provide desired functionality.

The network interface module 308 is arranged to receive data from the transmitter 104 across the network 108. The data packet associating module 306 is arranged to associate data packets received from the transmitter 104, as will be described in greater detail below. The authentication module 310 is arranged to authenticate received data packets.

Figure 4:
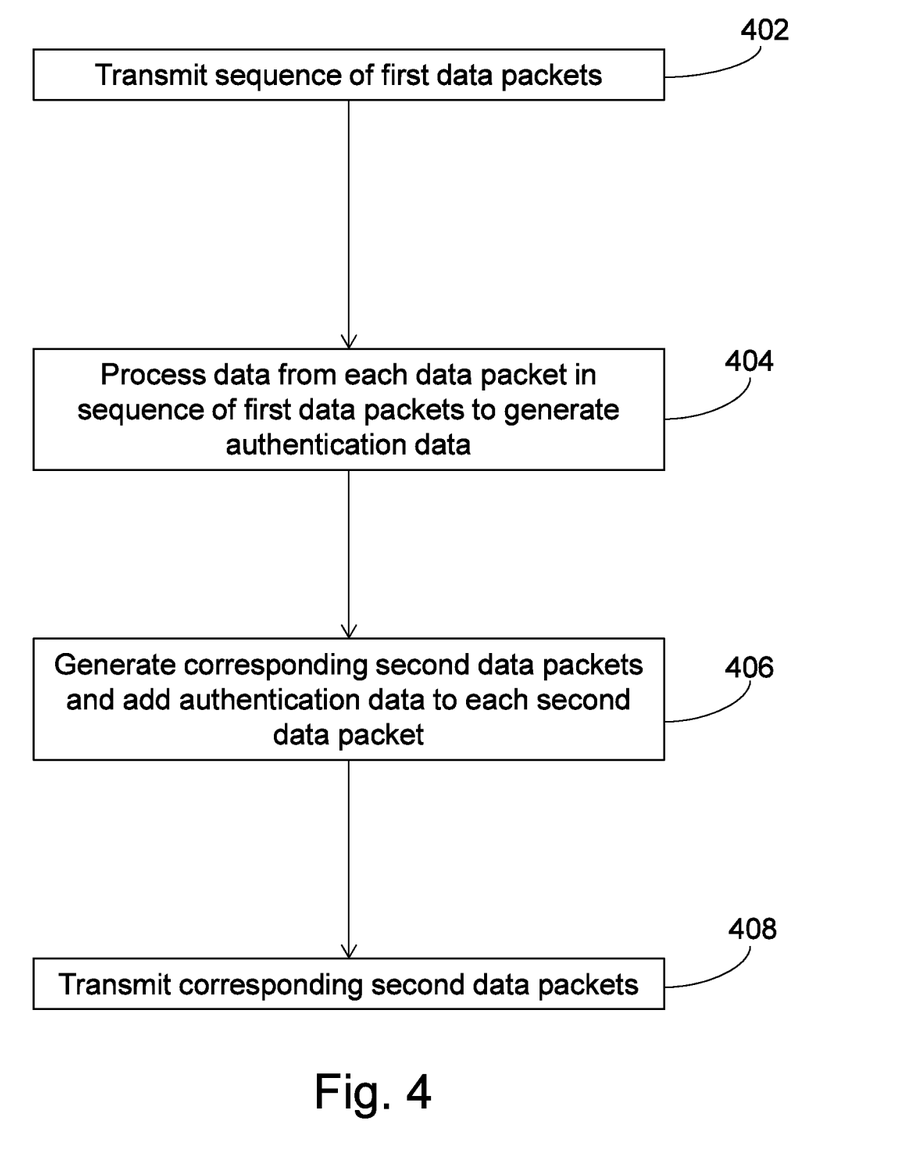
FIG. 4 illustrates a process for sending data across the communications network.

With reference to FIG. 4, a method of transmitting data to the receiver 108 via the network is described. At step 402, a sequence of first data packets, which are generated by the data packet generating module 210, is transmitted by the network interface module 208 of the transmitter 104, to the receiver 108 via the network 106. Each first data packet comprises payload data and identification data. The identification data of each first data packet identifies that first data packet. The identification data is different for each first data packet. The identification data may comprise a time stamp, a serial number, a sequence identifier and/or or other means of providing data which is different for each first data packet.

The payload of each of the first data packets comprises measurement data from the sensor 102 which has been received by the sensor interface module 206 of the transmitter 104. The measurement data from the sensor 102 may be converted into data packets, for example by the data packet generating module 210, in accordance with a network protocol of the network 106. Alternatively, the measurement data is received by the sensor interface module 206 as first data packets comprising the measurement data of the sensor 102.

The measurement data of each first data packet relates to a measurement made by the sensor 102. In other words, one sensor measurement is provided per packet which. In an example embodiment where the sensor 102 is a pressure sensor, the measurement data of each first data packet is a pressure measurement. Further, the measurement data of each first data packet fills, or substantially fills, the payload portion of the first data packet such that no additional data can be provided in first data packets sent across the network 106. In some embodiments, each measurement made by the sensor 102 could be a series of measurement, for example a series of pressure measurements taken over a predetermined period of time.

At step 404, data from each of the first data packets is processed by the authentication data generating module 212 to generate authentication data for each of the first data packets. In an embodiment, this step comprises applying an authentication function to data from each of the first data packets and the output of the authentication function for each first data packet is used as authentication data. In embodiments where a MAC algorithm is used, the cryptographic function (for example the MAC algorithm) is shared by both the transmitter 104 and the receiver 108, such that the receiver 108 is able to reproduce the authentication data (for example the MAC data tag) by applying a verification function (which comprises the same MAC algorithm) to data from each of the first data packets. In other embodiments, the authentication and verification functions may differ, for example where a digital signature scheme is used.

At step 406, a corresponding second data packet is generated by the data packet generating module 210 for each first data packet transmitted by the network interface module 208 of the transmitter 104 to the receiver 108 via the network 106. Each second data packet comprises data enabling identification of the corresponding first data packet and authentication data related to the corresponding first data packet. The inclusion of the data enabling identification of a corresponding first data packet in each second data packet enables the receiver 108 to associate each second data packet with the corresponding first data packet. The data enabling identification of the corresponding first data packet may comprise one or more of: the identification data of the corresponding first data packet, a hash of the identification data of the corresponding first data packet, and a key for an entry in a lookup table corresponding to the corresponding first data packet. The authentication data of each first data packet is added to the payload data of the corresponding second data packet.

At step 408, the corresponding second data packets for each first data packet are transmitted by the network interface module 208 of the transmitter 104, to the receiver 108 via the network 106

The method differs from conventional TCP/IP (Transmission Control Protocol/Internet Protocol) networks in that each first data packet comprises a measurement made by the sensor 102, in the form of measurement data, and a corresponding second data packet is provided which comprises additional data related to the first data packet, such as authentication data or metadata. Each second data packet comprises data enabling identification of the corresponding first data packet. Each of the first and second data packets can be associated with one another using the identification data of the first data packet and the data enabling identification of the corresponding first data packet, such that the data in the packets can be used together. For example, where the additional data of the second data packet is authentication data, the authentication data of the second data packet can be used to authenticate the data of the first data packet.

In contrast, where data packets (also known as segments) are sent across conventional TCP/IP networks, the header of each data packet contains a sequence number. The sequence number identifies the position of each data packet in the sequence of transmitted packets. The received packets are then ordered by sequence number by the recipient. As such, the packets do not identify other packets in the same manner as the method described herein. Any kind of unique reference number that allows a second data packet to refer to a first data packet can work. For example, the second data packet can refer to the TCP/IP packet number. It will be well understood that when first packets are numbered sequentially, there can also be a second data packet that covers a group of first packets. For example, from X to Y. In that case, the second data packet could authenticate the ensemble of packets from X to Y.

In an alternative embodiment, a corresponding third data packet is generated by the data packet generating module 210 for each first data packet and is transmitted by the network interface module 208 of the transmitter 104 to the receiver 108 via the network 106. As with the second data packet, each third data packet comprises data enabling identification of the corresponding first and/or second data packet and additional data related to the corresponding first and/or second data packet enabling the receiver 108 to associate each third data packet with the corresponding first and/or second data packet. Advantageously, this enables further additional data related to the corresponding first and/or second data packets to be transmitted across the network 106 in such a way that it can be subsequently associated with the data of the corresponding first and/or second data packet and the payloads of the data packets can be used together. It will be understood that any number of further data packets may be generated and transmitted across the network 106.

In some embodiments, steps 404 and 406 are not carried out, for example where the additional data of each second data packet includes metadata related to the corresponding first data packet which is not authentication data. Steps 404 and 406 may be replaced by other processing steps related to processing of the additional data.

Figure 5:
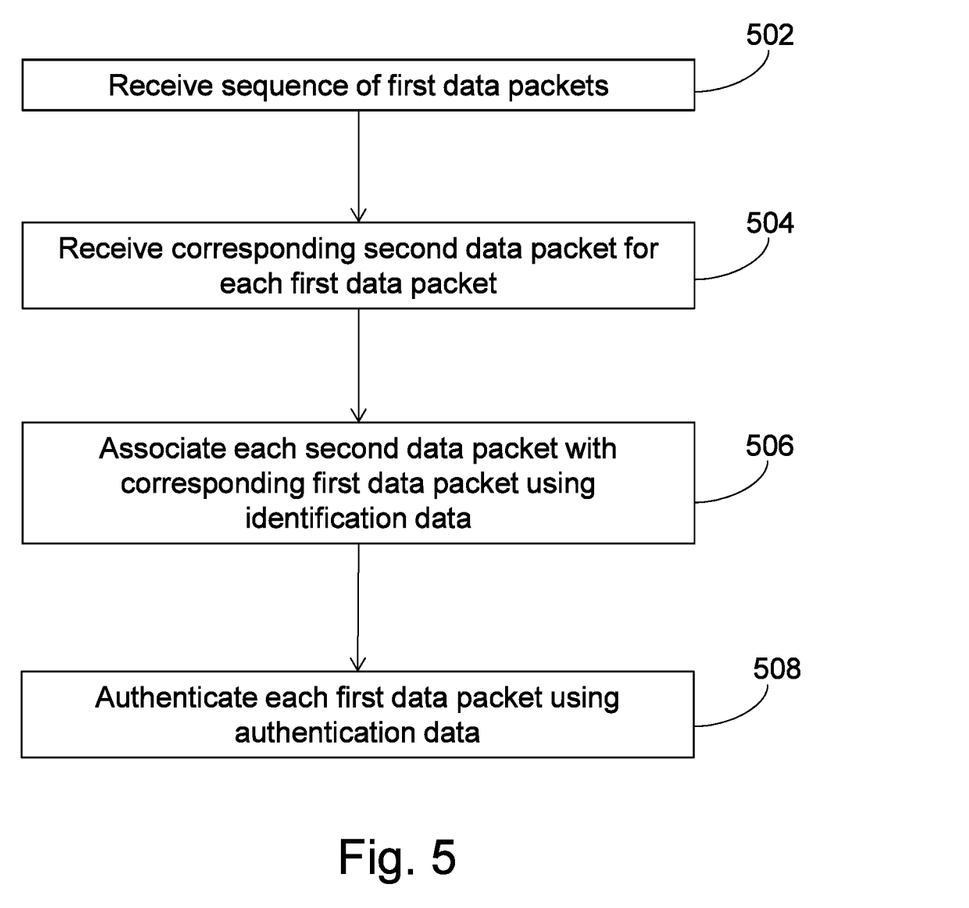
FIG. 5 illustrates a process for receiving data across the communications network.

With reference to FIG. 5, a method of receiving data from the transmitter 104 via the network 106 is described. At step 502, a sequence of first data packets is received by the network interface module 308 from the transmitter 104 via the network 106. Each first data packet comprises payload data and identification data. The identification data of each first data packet identifies that first data packet and is different for each first data packet.

At step 504, a corresponding second data packet for each first data packet is received by the network interface module 308 from the transmitter 104 via the network 106. Each second data packet comprises data enabling identification of the corresponding first data packet and authentication data related to the corresponding first data packet.

At step 506, each second data packet is associated with the corresponding first data packet by the data packet associating module 306, using the data enabling identification of the corresponding first data packet. For example, where this data enabling identification of the corresponding first data packet is the identification data of the first data packet, it could be compared with identification data of the first data packets to identify the corresponding first data packet.

At step 508, each of the first data packets is authenticated by the authentication module 310 using authentication data obtained from the additional data of the corresponding second data packet. In an embodiment, this step comprises applying a verification function to data from each of the first data packets to authenticate the first data packets. In some embodiments, the verification function is the same function as the authentication function, for example where the authentication and verification functions comprise a MAC algorithm, and the output of the verification function is compared with the authentication data. If there is a match, the first data packet has been successfully authenticated.

Referring back to FIGS. 2 and 3, the transmitter 104 and the receiver 108 each include a processor (in other words a processing device) 202, 302 in communication with a memory 204, 304. The memory 204, 304 of each of the transmitter 104 and the receiver 108 may comprise one or more of a main memory (e.g., read-only memory (ROM), flash memory, dynamic random access memory (DRAM) such as synchronous DRAM (SDRAM) or Rambus DRAM (RDRAM), etc.), a static memory (e.g., flash memory, static random access memory (SRAM), etc.), and a secondary memory (e.g., a data storage device), which communicate with each other via a bus.

The processing device 202, 302 of each of the transmitter 104 and the receiver 108 may comprise one or more general-purpose processors such as a microprocessor, central processing unit, or the like. More particularly, the processing device may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. The processing device is configured to execute the processing logic (instructions) for performing the operations and steps discussed herein.

The data storage device may include one or more machine-readable storage media (or more specifically one or more non-transitory computer-readable storage media) on which is stored one or more sets of instructions embodying any one or more of the methodologies or functions described herein. The instructions may also reside, completely or at least partially, within the main memory and/or within the processing device during execution thereof by the computer system, the main memory and the processing device also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet.

Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "enabling", "maintaining," "identifying," "generating," "associating," "inputting," "authenticating," "adding," "transmitting," "processing," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

Having read the above description of some specific embodiments, it will be understood that the following embodiments are disclosed:

A method of transmitting data to a receiver via a network, wherein the method may comprise the steps of:
transmitting a sequence of first data packets to the receiver via the network, wherein each first data packet comprises payload data and identification data, the identification data identifying the respective first data packet, the identification data being different for each first data packet; and
transmitting a corresponding second data packet for each first data packet to the receiver via the network, each second data packet comprising the data enabling identification of the corresponding first data packet and additional data related to the corresponding first data packet, the data enabling identification of the corresponding first data packet enabling the receiver to associate each second data packet with the corresponding first data packet.

The method of transmitting data to a receiver via a network may further comprise the steps of:
processing data from each of the first data packets to generate authentication data for each of the first data packets; and
adding the authentication data as payload data to each corresponding second data packet, wherein the additional data of each second data packet comprises the added authentication data.

The method of transmitting data to a receiver via a network wherein the step of processing data from each of the first data packets may comprise applying an authentication function to data from each of the first data packets, wherein the authentication data for each of the first data packets comprises an output of the authentication function.

The method of transmitting data to a receiver via a network may further comprise the step of receiving device data from a device, wherein the payload data of each first data packet comprises data received from the device.

The method of transmitting data to a receiver via a network wherein the device may comprise a sensor and, wherein the device data is sensor measurement data.

A method of receiving data from a transmitter via a network which may comprise the steps of:
receiving a sequence of first data packets from the transmitter via the network, wherein each first data packet comprises payload data and identification data, the identification data identifying the respective first data packet, the identification data being different for each first data packet; and
receiving a corresponding second data packet for each first data packet from the transmitter via the network, each second data packet comprising the data enabling identification of the corresponding first data packet and additional data related to the corresponding first data packet; and
associating each second data packet with the corresponding first data packet using the data enabling identification of the corresponding first data packet.

The method of receiving data from a transmitter via a network wherein the additional data of each second data packet may comprise authentication data for authenticating the corresponding first data packet, the method may further comprise the step of authenticating each of the first data packets by verifying the authentication data obtained from the corresponding second data packet.

The method of receiving data from a transmitter via a network wherein the step of authenticating each of the first data packets may comprise the step of applying a verification function to data from each of the first data packets to authenticate the first data packets.

A transmitter for transmitting data to a receiver via a network, wherein the transmitter may comprise a processing environment configured to:
transmit a sequence of first data packets to the receiver via the network, wherein each first data packet comprises payload data and identification data, the identification data identifying the respective first data packet, the identification data being different for each first data packet; and
transmit a corresponding second data packet for each first data packet to the receiver via the network, each second data packet comprising the data enabling identification of the corresponding first data packet and additional data related to the corresponding first data packet, the data enabling identification of the corresponding first data packet enabling the receiver to associate each second data packet with the corresponding first data packet.

The transmitter for transmitting data to a receiver via a network, wherein the processing environment may be further configured to receive data from a device, wherein the payload data of each first data packet comprises data received from the device.

The transmitter for transmitting data to a receiver via a network, wherein the device may comprise a sensor and, wherein the transmitter comprises a sensor interface.

The transmitter for transmitting data to a receiver via a network, wherein the processing environment may be further configured to:
process data from each of the first data packets to generate authentication data for authenticating each of the first data packets; and
add the authentication data as payload data to each corresponding second data packet, wherein the additional data of each second data packet comprises the added authentication data.

A sensor comprising said transmitter for transmitting data to a receiver via a network.

A receiver for receiving data from a transmitter via a network wherein the receiver may comprise a processing environment configured to:
receive a sequence of first data packets from the transmitter via the network, wherein each first data packet comprises payload data and identification data, the identification data identifying the respective first data packet, the identification data being different for each first data packet; and
receive a corresponding second data packet for each first data packet from the transmitter via the network, each second data packet comprising the data enabling identification of the corresponding first data packet and additional data related to the corresponding first data packet; and
associate each second data packet with the corresponding first data packet using the data enabling identification of the corresponding first data packet.

The receiver for receiving data to from a transmitter via a network wherein the additional data of each second data packet may comprise authentication data for authenticating the corresponding first data packet, wherein the processing environment is further configured to authenticate each of the first data packets by verifying the authentication data obtained from the corresponding second data packet.

The receiver for receiving data to from a transmitter via a wherein the processing environment may be further configured to apply a verification function to data from each of the first data packets so as to authenticate each of the first data packets.

A protocol of the network may define a data packet size for data packets which are transmitted across the network, wherein the payload data each first data packet is substantially filled by data received from a device for the methods, the transmitter and the receiver.

The identification data of each first data packet may comprise one or more of a time stamp, serial number, and sequence identifier.

The payload data of each first data packet may comprise sensor data produced by a sensor.

The additional data of each second data packet may be related to the payload data of the corresponding first data packet.

A computer program product comprising instructions which, when the program may be executed by a computer, may cause the computer to carry out the method of receiving data from a transmitter via a network.

A non-transitory computer readable medium having computer-executable instructions that, when executed on a computer system, may implement the method of receiving data from a transmitter via a network.

The invention claimed is:

1. A method of transmitting data to a receiver via a network, the method comprising:
   transmitting a sequence of first data packets to the receiver via the network, wherein each first data packet comprises payload data and identification data, the identification data identifying the respective first data packet, the identification data being different for each first data packet; and
   transmitting a corresponding second data packet for each first data packet to the receiver via the network, each second data packet comprising first data enabling identification of the corresponding first data packet and authentication data of the corresponding first data packet, the first data enabling identification of the corresponding first data packet enabling the receiver to associate each second data packet with the corresponding first data packet and the first data being different from the authentication data.

2. The method of claim 1, further comprising:
   processing data from each of the first data packets to generate authentication data for each of the first data packets; and
   adding the authentication data as payload data to each corresponding second data packet, wherein the authentication data of each second data packet comprises the added authentication data.

3. The method of claim 2, wherein the processing data from each of the first data packets comprises applying an authentication function to data from each of the first data packets, wherein the authentication data for each of the first data packets comprises an output of the authentication function.

4. The method of claim 1, further comprising receiving measurement data from a sensor, wherein the payload data of each first data packet comprises the measurement data received from the sensor.

5. The method of claim 1, wherein the payload data of each first data packet comprises measurement data produced by a sensor.

6. A non-transitory computer readable medium having computer-executable instructions that, when executed on a computer system, implement the method of claim 1.

7. The method of claim 4, wherein a protocol of the network defines a data packet size for data packets which are transmitted across the network, wherein the payload data of each first data packet is substantially filled by data received from the sensor.

8. A method of receiving data from a transmitter via a network, the method comprising:
   receiving a sequence of first data packets from the transmitter via the network, wherein each first data packet comprises payload data and identification data, the identification data identifying the respective first data packet, the identification data being different for each first data packet; and
   receiving a corresponding second data packet for each first data packet from the transmitter via the network, each second data packet comprising first data enabling identification of the corresponding first data packet and authentication data of the corresponding first data packet, the first data being different from the authentication data; and
   associating each second data packet with the corresponding first data packet using the data enabling identification of the corresponding first data packet.

9. A transmitter for transmitting data to a receiver via a network, the transmitter comprising:
   processing circuitry configured to:
   transmit a sequence of first data packets to the receiver via the network, wherein each first data packet comprises payload data and identification data, the identification data identifying the respective first data packet, the identification data being different for each first data packet; and
   transmit a corresponding second data packet for each first data packet to the receiver via the network, each second data packet comprising first data enabling identification of the corresponding first data packet and authentication data of the corresponding first data packet, the first data enabling identification of the corresponding first data packet enabling the receiver to associate each second data packet with the corresponding first data packet and the first data being different from the authentication data.

10. The transmitter of claim 9, wherein the processing circuitry is further configured to receive measurement data from a sensor, wherein the payload data of each first data packet comprises the measurement data received from the sensor.

11. The transmitter of claim 9, wherein the processing circuitry is further configured to:
   process data from each of the first data packets to generate authentication data for authenticating each of the first data packets; and
   add the authentication data as payload data to each corresponding second data packet, wherein the authentication data of each second data packet comprises the added authentication data.

12. A sensor comprising the transmitter of claim 9.

13. A receiver for receiving data from a transmitter via a network, the receiver comprising:
  processing circuitry configured to:
   receive a sequence of first data packets from the transmitter via the network, wherein each first data packet comprises payload data and identification data, the identification data identifying the respective first data packet, the identification data being different for each first data packet; and
   receive a corresponding second data packet for each first data packet from the transmitter via the network, each second data packet comprising first data enabling identification of the corresponding first data packet and authentication data of the corresponding first data packet, the first data being different from the authentication data; and
   associate each second data packet with the corresponding first data packet using the data enabling identification of the corresponding first data packet.

* * * * *